No. 12,212. REISSUED APR. 12, 1904.
H. FATIC.
ADJUSTABLE WHEEL FLANGE.
APPLICATION FILED MAR. 4, 1902.
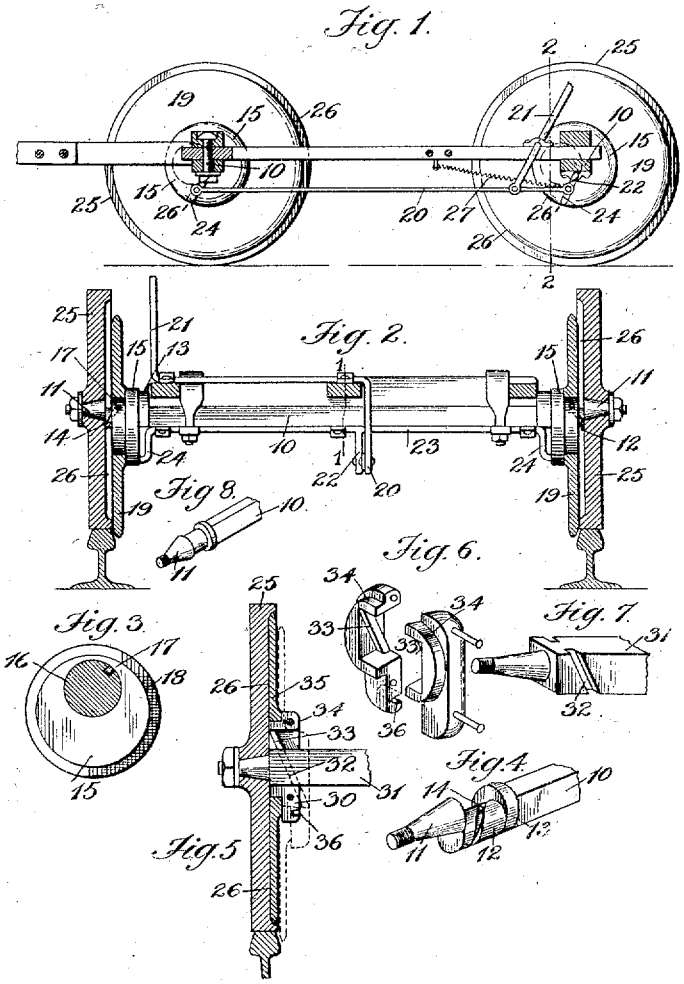
Witnesses:
Oscar A. Theline
Paul Carpenter
Inventor:
Henry Fatic
by Paul Synnestvedt
Atty No. 12,212. Reissued April 12, 1904.

UNITED STATES PATENT OFFICE.

HENRY FATIC, OF MIDDLETOWN, INDIANA, ASSIGNOR, BY MESNE ASSIGNMENTS, TO SWANITZ COMPANY, OF CHICAGO, ILLINOIS, A CORPORATION OF DELAWARE.

ADJUSTABLE WHEEL-FLANGE.

SPECIFICATION forming part of Reissued Letters Patent No. 12,212, dated April 12, 1904.

Original No. 650,505, dated May 29, 1900. Application for reissue filed March 4, 1902. Serial No. 96,712.

*To all whom it may concern:*

Be it known that I, HENRY FATIC, a citizen of the United States, residing at Middletown, in the county of Henry and State of Indiana, have invented certain new and useful Improvements in Adjustable Wheel-Flanges, of which the following is a specification, reference being had to the accompanying drawings.

My invention relates to a flange for the tread of a vehicle-wheel that is separate from the revolving wheel, being supported by a sleeve on the axle, but can be made to extend below the tread of the wheel similar to the integral flange on a car-wheel in close proximity to the tire of the wheel, or can be drawn upwardly when it is desired to use the vehicle on a roadway instead of on a raised track.

Referring to the drawings, in which the numerals refer to the same parts in the several views, Figure 1 is an elevation of a running-gear of a wagon, taken on the line 1 1 of Figure 2, showing parts in plan.

Figure 2 is an elevation taken on the line 2 2 of Figure 1.

Figure 3 is the eccentric disk.

Figure 4 is a perspective view of part of the axle.

Figures 5, 6, and 7 show a modification.

Figure 8 is another modification.

In the several views 10, represents the axles of the vehicle, in Figures 1 to 5 made of iron. At their extremities they are shaped as shown in Figure 4. The main part of the axle 10 is connected with the journal extremity 11 by an eccentric spindle 12. Between the spindle and the part 10 is a collar 13. (Shown in Figure 4 in detail.) This spindle has a spiral groove 14, to be referred to hereinafter. An eccentric sleeve 15 has its aperture 16 to rotate on the spindle 12 as a bearing. The parts 11 and 12 are made separately from the main part of the axle 10 and preferably the spindle 12 is tapped into the part 10 after the sleeve 15 has been slipped on the spindle. The thickness of the sleeve is about half the length of the spindle 12, and the aperture 16 has a pin 17, that engages the spiral groove 14. It will be observed that the aperture 16 is eccentric to the periphery of the sleeve and the eccentricity is made just equal to that of the spindle 12 with the hub 11. The sleeve has a flange 18, against which on the smaller periphery of the sleeve rotates a wheel or disk 19, preferably made as shown in Figure 1. A set of levers serve to operate on the sleeve 15 to give it the spiral movement, consisting of main lever 20, extending fore and aft and actuated by a usual form of brake-handle 21, that has the customary locking-rack on the side of the wagon-body. The lever 20 at each end is jointed to an arm 22 of a rock-shaft 23, one on each axle. This rock-shaft has a bent arm 24 at each end, whose extremity engages a slot 26′ in the inner face of the sleeve 15. Consequently when the system of levers is actuated these four arms 24 will each give the sleeves 15 a spiral movement on the spindles 12; but the eccentric bearing of the disk 19 will give it a rotary motion of translation with respect to the wheel, and the spiral movement of the sleeve will also cause a simultaneous movement of the disk to or from the said wheel. Now the eccentricity of the sleeve being equal to that of the spindle 12 to the axle 11, it is evident that as the said eccentricity of the spindle is greatest in a downward direction when the sleeve is in its highest position from the ground-line the periphery of the sleeve on which the disk revolves will be concentric with the wheel; also, that in the lowest position of the sleeve the said disk will be in the position of greatest eccentricity. The location of the pin 17 on the sleeve is such that when the said spiral movement of the sleeve brings it nearest to the wheel the disk revolving on the sleeve will be in its uppermost position and nearest to the wheel, while when the sleeve is in the farthest position from the wheel the disk will be in its lower position.

The wheels, as shown in the views, are preferably made with a flange 25 on the inner face, thus forming a recess 26. The disks 19 are preferably of the same diameter as this recess. Consequently when the disk is in its uppermost position and nearest to the wheel it will be located in the recess 26, and being concentric with the wheel in this position they will revolve together, as shown in Figure 1, also in the modified form of Figure 5; but when the disk is given a movement inwardly and downwardly it will leave the recess 26 and will have its lower periphery to extend below the flange 25 and in close proximity thereto, as shown in Figure 2. It is in this latter position that the vehicle is adapted to run on a raised track, the disk extending below the tread of the wheel having the function of the usual extending flange of a car-wheel. A spiral spring 27 serves to normally retain the levers, with the disk, against the wheel and out of use.

In the modification shown in Figures 5, 6, and 7 the sleeve 30 is made sectional, as shown in Figure 6. The axle 31 in this case is rectangular and contains two diagonal slots 32 on opposite sides. The aperture in the sleeve 30 is shaped to fit on the axle and slide vertically thereon, the opening being longer than the vertical depth of the axle. On the opposite sides of this aperture are located feathers 33 33, which engage the grooves 32 32 on the sides of the axle 31. The sleeve-sections are bolted together on the axle, with the feathers 33 sliding in the said grooves 32. Hence any force applied to the sleeve tending to move it vertically will give it a movement diagonal to the wheel and axle. This sleeve 30 has a bearing 34, on which rotates a disk 35. When the sleeve 30 is in the uppermost position, the disk will be in close proximity to the wheel, as shown in Figure 6, and when the sleeve is in the lower position the disk will have its lower periphery to extend below the tread of the wheel, similar to the disk in Figure 2. To impart movement to the sleeve 30, it has a slot 36 in its inner side face, in which operates an arm 24, similar to that shown in Figure 2.

While I preferably form the bearing on the axle for the sleeve eccentric with the axle, as shown in Figure 4, this sleeve-bearing may be concentric with the axle, as shown in Figure 8, and no longer than the width of the sleeve, in which case the disk will not have a movement to and from the wheel, but it will be given a movement of translation in its plane of rotation. It will approach and recede from the rails by a motion through an arc of a circle, as in the form shown in Figure 1.

Having thus described my invention, what I claim is—

1. In the mechanism of the character described, the combination with the wheel and the axle, of a sleeve mounted on said axle, a disk rotating on said sleeve, means for normally retaining said sleeve with said disk concentric with said wheel, and means for moving said sleeve to a position in which said disk shall be eccentric to said wheel with its lower periphery extending below the tread of said wheel, substantially as set forth.

2. In a mechanism of the character described, the combination with the recessed wheel and the axle, of a sleeve mounted on said axle, a disk rotating on said sleeve, means for normally retaining said sleeve with said disk concentric with said wheel and located in said recess, and means for moving said sleeve to a position in which said disk shall be eccentric to said wheel with its lower periphery extending below the tread of said wheel, substantially as set forth.

3. In a mechanism of the character described, the combination with the wheel and the axle, of a sleeve mounted on said axle, a disk on said sleeve, and means for giving said sleeve and disk a movement of translation in a direction diagonal to the plane of rotation of said wheel and also to the axis of said axle, substantially as and for the purposes set forth.

4. In a mechanism of the character described, the combination with the wheel and the axle, a sleeve mounted on said axle and a disk on said sleeve, of means for imparting a movement of translation to said disk and sleeve in a spiral direction to and from said wheel, substantially as and for the purposes set forth.

5. In a mechanism of the character described, the combination with the wheel and axle, of an eccentric spindle connecting the journal-bearing of said axle with the axle proper, said spindle having a spiral groove thereon, a flanged sleeve having an aperture therein eccentric to its periphery, said aperture adapted to fit on said spindle, said sleeve having also a slot in its inner face, a pin on said sleeve engaging said spiral groove on said spindle, a disk revolving on said flange on said sleeve, and a bent lever engaging said slot in said sleeve and adapted to impart a spiral movement to said sleeve and disk, substantially as and for the purposes set forth.

6. In a mechanism of the character described, the combination with the wheel and the axle, of a sleeve mounted on said axle and in proximity to said wheel, a bearing on said sleeve eccentric to said bearing of said sleeve on said axle, a disk mounted on said bearing on said sleeve, and means for rotating said sleeve on said axle, to give said disk a movement of translation, substantially as set forth.

7. A wheel and axle in combination with an eccentric sleeve on said axle, a flange-disk separate from said wheel and mounted on the sleeve, whereby a shifting of said sleeve is permitted, to bring the disk into predetermined position, and locking mechanism for holding said disk in such position.

8. The combination of a wheel and axle, an eccentric sleeve mounted to rotate on the axle, and a flange disk on said sleeve separate from said wheel, whereby the rotation of said eccentric sleeve throws said flange outside the periphery of the wheel.

9. The combination of an axle, a wheel having a recessed side, an eccentric sleeve mounted to rotate on the axle, and carrying a disk normally resting in the recess of the wheel, and means for withdrawing the disk from the recess and protruding it at the bottom of the wheel, by the rotation of said sleeve, substantially as described.

10. A recessed wheel provided with a revolvable flange disk of less diameter than the wheel, rotary means for shifting the said disk out of the recess and beyond the periphery of the wheel, substantially as described.

11. In a vehicle wheel, an eccentrically mounted flange disk, an axle carrying the bearing of said disk, and a spiral engaging device on the axle, whereby the rotation of the disk will remove it from the wheel and protrude it beyond the circumference of the wheel, substantially as described.

12. The combination with a vehicle wheel and axle, of an eccentric sleeve carrying a disk, mounted to rotate upon said axle and adapted to fit closely within the wheel, and a spiral groove in the axle and an engaging pin in the sleeve of the disk, whereby the rotation of the sleeve withdraws the disk from the wheel and protrudes it beyond the circumference of the wheel, substantially as described.

In testimony whereof I have hereunto set my hand in the presence of the subscribing witnesses.

HENRY FATIC.

Witnesses:
PAUL CARPENTER,
JENNIE FATIC,
F. A. WISEHART.